US007705251B2

(12) United States Patent
Herrmann

(10) Patent No.: US 7,705,251 B2
(45) Date of Patent: Apr. 27, 2010

(54) REST ELEMENT FOR A LIFTING PLATFORM

(75) Inventor: Johannes Herrmann, Pösing (DE)

(73) Assignee: Herrmann AG (DE)

( * ) Notice: Subject to any disclaimer, the term of this patent is extended or adjusted under 35 U.S.C. 154(b) by 194 days.

(21) Appl. No.: 11/770,349

(22) Filed: Jun. 28, 2007

(65) Prior Publication Data

US 2008/0296071 A1 Dec. 4, 2008

(30) Foreign Application Priority Data

Jul. 4, 2006 (EP) ................................ 06116565

(51) Int. Cl.
*G01G 3/14* (2006.01)

(52) U.S. Cl. .................... 177/211; 73/862.625; 177/136

(58) Field of Classification Search ................. 177/211, 177/136; 73/862.625–862.634, 862.636
See application file for complete search history.

(56) References Cited

U.S. PATENT DOCUMENTS 3,960,013 A * 6/1976 Ormond ..................... 177/211
4,146,864 A * 3/1979 Bethe ............................ 338/5
4,685,526 A * 8/1987 Holm ......................... 177/211
5,222,399 A * 6/1993 Kropp ..................... 73/862.68
5,313,022 A * 5/1994 Piroozmandi et al. ....... 177/211
7,538,281 B2 * 5/2009 Pottebaum et al. .......... 177/211

FOREIGN PATENT DOCUMENTS

JP 2004-284714 10/2004
JP 2005-60050 3/2005

* cited by examiner

*Primary Examiner*—Randy W Gibson
(74) *Attorney, Agent, or Firm*—Hayes Soloway P.C.

(57) ABSTRACT

The invention relates to a rest element (2, 20) for lifting platforms, which can be arranged between a support element (30) of the lifting platform and a vehicle to be lifted. According to the invention, the rest element (2, 20) can be removed from the support element (30) and has a sensor device (4) for measuring a weight force acting between the vehicle and the support element (30). In addition, a transmitting device (14) is provided which outputs a signal characteristic of this weight force.

12 Claims, 4 Drawing Sheets

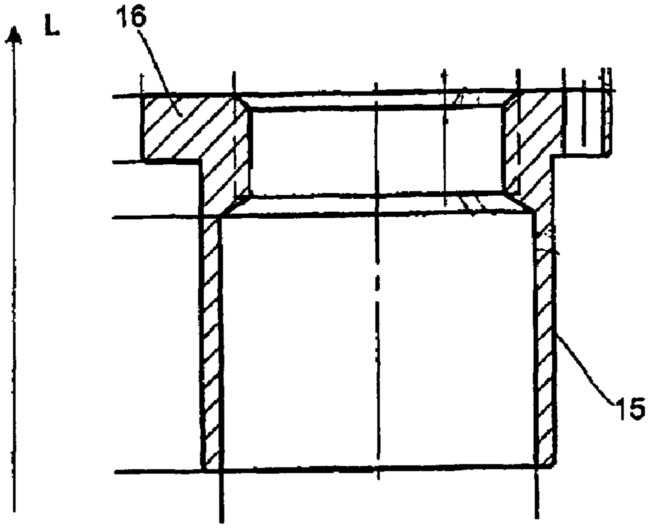
Fig. 4
Fig. 5
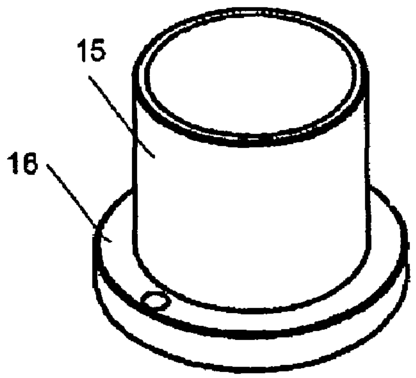
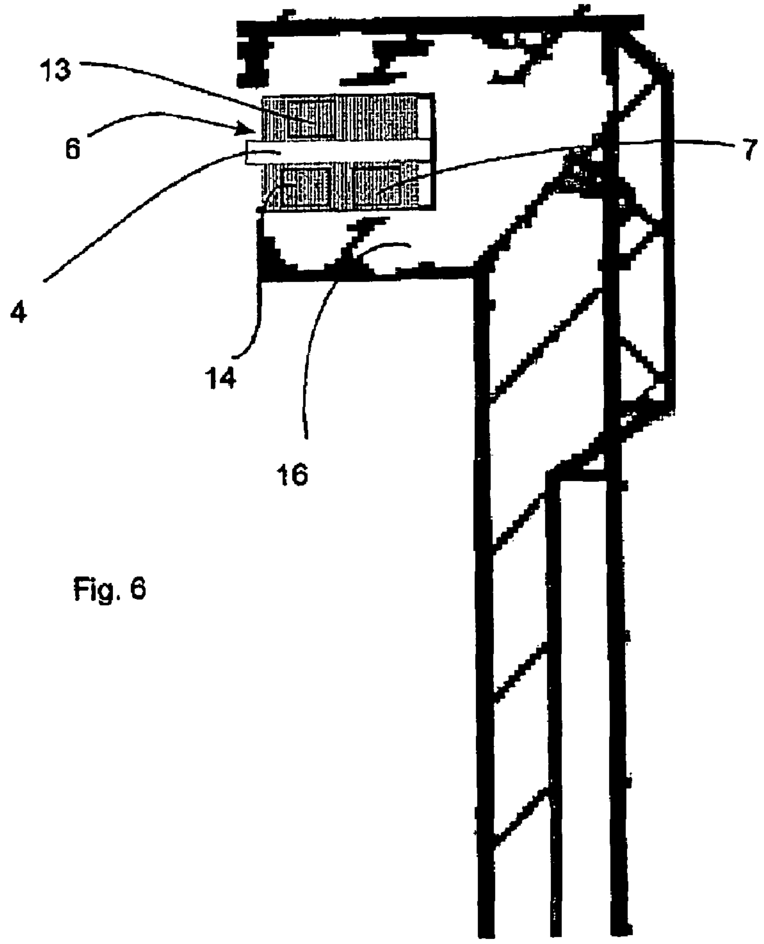
Fig. 6

REST ELEMENT FOR A LIFTING PLATFORM

The present invention relates to a lifting platform for motor vehicles. Such lifting platforms have long been known from the prior art. The invention will be described with reference to a lifting platform for motor vehicles and in particular to a two-column lifting platform, wherein a lifting device which can be raised and lowered in the vertical direction is arranged on each column. This lifting device has horizontally pivotable support arms for holding the motor vehicle.

With such lifting platforms, care should always be taken to ensure that the individual bearing points between the support arms or the bearing surfaces thereof and the regions of the vehicle to be lifted are selected in a precise manner and the force ratios do not change over the course of the lifting process. In particular, care should be taken to ensure that the holding elements of the lifting platform are arranged at the correct bearing points on the object or vehicle to be lifted. If a bearing surface is not properly selected, the corresponding holding element may completely disengage during the lifting process and this may even lead to tipping or dropping of the vehicle.

A lifting platform, in particular a two-column lifting platform for motor vehicles, is known from DE 29 37 582 A1. This lifting platform has force measuring devices on the support elements, the output signals of which force measuring devices are passed to a downstream safety circuit. By virtue of these signals output by the force measuring devices, any imbalance of the vehicle can be detected. In this case, the force measuring device is fixedly integrated in the system of the lifting platform, or the support arms of the lifting platform are already adapted for these force measuring devices. The system known from DE 29 37 582 A1 therefore cannot be used on or retrofitted to existing lifting platforms. Moreover, in the event of failure of individual force measuring devices, replacement thereof is possible only with difficulty since they are fixedly integrated in the lifting platform system.

The object of the present invention is therefore to improve the safety of lifting platforms and in the process also to be able to equip even existing or older models with such safety systems. A further object of the invention is to provide a lifting platform which allows correction possibilities in the event of an imbalance.

According to the invention, this is achieved by a rest element according to claim 1 and a support arm for a lifting platform according to claim 8. Advantageous embodiments and further developments form the subject matter of the dependent claims.

The rest element according to the invention for lifting platforms can be arranged between a support element of the lifting platform and a vehicle to be lifted, and according to the invention can be removed from the support element and has a sensor device for measuring a weight force acting between the vehicle and the support element or transmitted from the vehicle to the support element, wherein the sensor device outputs a signal which is characteristic of this weight force. In addition, a transmitting device is provided which outputs the signal characteristic of this weight force or a signal derived from this signal. An arrangement whereby the rest element can be removed from the support element is understood to mean that said rest element can be removed from the support element in particular without damaging the support element or the rest element, for example by being pulled off or unscrewed, in particular without using a tool. It is also understood to mean that the rest element can be removed from the support element of the lifting platform without a high outlay in terms of time or energy. In this way, simple replacement and simple retrofitting of older models is possible. Preferably, the rest element can be pushed into a region of the support element.

A sensor device is understood to mean any sensor device which is suitable for measuring weight forces acting between the vehicle and the support element of the lifting platform. Preferably, the sensor device is a force measuring device. Particularly advantageously, the sensor device is a strain gauge which is arranged in the region of the rest element. In one advantageous embodiment, the rest element is a body which is placed on the support element and in a further embodiment is a rest element which is screwed to part of the support element. The support element is in particular a region of the support arm of the lifting platform or a segment of this support arm.

Particularly preferably, the rest element is arranged at the bearing area of the support element for the vehicle.

This also means that the sensor device is directly influenced by the weight force of the vehicle and is not forwarded through a plurality of further support arms.

In one preferred embodiment, the rest element has a transmitting device which outputs wirelessly to a receiving device the characteristic signal output by the output device. In principle, it would also be possible to connect the rest element via a cable connection to a central device, or else to equip the rest element directly with an output device such as a display. However, a wireless connection between the rest elements and the receiving device is advantageous.

In addition to the output characteristic signal for the force, the transmitting device preferably also outputs an identification signal which uniquely characterizes the rest element. For example, it is thus possible for both a signal characteristic of the measured force and also an identification code to be output in the form of a binary code. In this way, it is possible for example for a central computer to ascertain the rest element from which the corresponding signal originates. This prevents for example the situation whereby a signal is detected which originates from a different rest element, and in this way it is possible to avoid confusion.

Particularly preferably, the signal is transmitted via electromagnetic waves, wherein radio, infrared light, ultraviolet light and the like may be used in particular.

In a further preferred embodiment, the rest element has a power storage device such as a battery. The rest element can thus output all measurement signals autonomously.

However, it would also be possible to provide the rest element with the necessary power via other power supply means such as induction loops and the like. It would also be possible to connect the rest element to an external power source.

In a further preferred embodiment, further force measuring devices such as strain gauges are also provided on the support arms of the lifting platform. Force measuring devices, in particular comprising strain gauges, can also be arranged on the corresponding lifting columns.

In a further preferred embodiment, transponders or the like may also be used to transmit the measured data such as the weight forces.

In a further advantageous embodiment, the holding element has a holding plate for holding a region of the vehicle and also a sleeve body, wherein the sensor device is preferably provided in the sleeve body. In this embodiment, the rest element is thus designed in two parts and consists of the holding plate and the sleeve body. In this case, the sleeve body particularly advantageously has a sleeve section which holds a region of the holding plate and also a circumferential collar which is supported against the support element of the lifting platform. Particularly advantageously, the sensor device is arranged in this circumferential collar. In this case, the weight force acting from the motor vehicle is transmitted via the holding plate to the sleeve section and more specifically the circumferential collar. By arranging sensor devices in this circumferential collar, it is thus possible to measure the weight forces directly. Particularly preferably, the lower region of this circumferential collar is supported against the support element. This embodiment allows quick and easy removal of the rest element from the support element, since the rest element can for example simply be inserted in an opening of the support element. It is thus possible to replace the rest element without using tools.

In a further preferred embodiment, the rest element has a plurality of sensor devices which are distributed uniformly in the circumferential direction of the circumferential collar. In this way, the weight force of the vehicle can be determined more precisely, wherein for example faulty sensor devices can be detected or else the output values of the individual sensor devices can be averaged.

In this case it is possible that the individual sensor devices respectively transmit the values to the output device. In a further preferred embodiment, the holding plate can be moved with respect to the sleeve body in a longitudinal direction of the sleeve section. In this way, a correction of the individual bearing points with respect to the vehicle can be achieved. However, at the same time, the force measurement is not affected by this movement of the holding plate with respect to the sleeve body, since the circumferential collar continues to be supported on the support arm.

Particularly preferably, the holding plate or the region of the holding plate which is held by the sleeve section of the sleeve body has an outer thread and the sleeve section has an inner thread. By means of such an arrangement, a particularly low-wear force transmission and also a height adjustability can be achieved.

In another embodiment, the holding element has a main body made of a material which is deformable at least in one direction, and the sensor device is provided in the interior of this main body. In particular, the main body is deformable at least in that direction in which the weight force of the vehicle acts. The interior of this main material preferably contains, in addition to the sensor device, also a power storage device and a transmitting device. The main body is preferably made of a hard rubber material which is able to withstand the high weight forces of a vehicle without being damaged thereby. In this embodiment, too, the sensor device is particularly preferably a strain gauge. However, it would also be possible to measure deformations in a direction perpendicular to the weight force.

The present invention furthermore relates to a support arm for a lifting platform, comprising a first support arm section and a second support arm section which is connected to the first support arm section and can be moved in a telescopic manner with respect thereto. According to the invention, a sensor device for measuring a weight force of the vehicle is arranged on the second arm section. Advantageously, the sensor element here is also a strain gauge. This is particularly preferably arranged at the end of the second support arm section facing towards the vehicle or the bearing point on the vehicle. In this way, too, a largely direct measurement of the forces occurring is possible.

The present invention also relates to a lifting platform comprising at least one rest element or at least one support arm of the type described above.

The present invention also relates to a measuring arrangement for lifting platforms, comprising a plurality of rest elements and a central working unit, wherein the working unit has a receiving device for the signals output by the transmitting devices of the rest elements. This may for example be a central computer which receives the signals from the rest elements. Preferably, this working unit can distinguish between the incoming signals on the basis of their identification signal and can assign them to a specific rest element.

Particularly preferably, the working unit has a memory device in which vehicle-specific characteristic data are stored, such as for example the ratios between a weight force acting on the rear axle and a weight force acting on the front axle.

In this way, it is possible for the processor device to decide, based on the measured weight forces, which rest elements are assigned to the front region of the vehicle and which rest elements are assigned to the rear region of the vehicle. In many vehicles for example, it is conceivable that twice the weight force acts on the front rest elements than on the rear rest elements, since the engine is arranged in the front region of the vehicle. In other vehicles, weight ratios of 2:3 occur. By defining these known ratios, the rest elements can thus be assigned to the positions on the vehicle. In this way, it is possible to adhere to the load distributions prescribed by the relevant EC standards.

Taking account of the total weight of the vehicle, the processor device also makes the decision as to whether weight ratios of 2:1 or 3:2 will apply. By way of example, a ratio of 2:1 will apply for a total weight of 3.0 t, i.e. a typical weight for cars, and a ratio of 3:2 will apply for a higher weight. In addition, the processor device can also permit certain deviations from the abovementioned nominal ratios, such as for example deviations of between +5% and −5% from the nominal value.

However, it would also be possible for the individual rest elements to be provided with inscriptions which make it possible for the operating personnel to assign them correctly, such as for example "front right", "back left" and the like.

The identification codes of the individual rest elements are preferably also stored in the processor device, so that the processor device can distinguish whether a given signal originals from an assigned rest element or for example from another rest element. The identification codes which are stored in the working unit can preferably be changed. It is thus possible for example for damaged rest elements to be replaced with new rest elements, and in this way operation can be continued. Preferably, the processor device can be switched between a learning mode and a working mode, wherein in the learning mode new rest elements can be read in.

In a further preferred embodiment, the working unit also has a display or a display device. The individual measured weight forces can be output for example on this display. An alarm device may also be provided which, when a given weight force value is exceeded or undershot, outputs an alarm signal and for example stops a lifting process. Furthermore, the alarm device can also bring about the situation whereby only a downward movement of the lifting platform is possible. In addition, it is also possible for more precise information, for example about the precise weight distribution at different bearing points, to be output on this display.

Preferably, the measurement of the weight forces takes place at predefined intervals, for example in a 5-second cycle. However, it would also be possible to control the intervals as a function of the respective movement of the lifting platform and to select a longer interval in the rest state than during a lifting movement. For this purpose, acceleration sensors could additionally be installed in the rest elements, which acceleration sensors detect a movement of the respective rest element.

Advantages and expedient features can be found in the following description in conjunction with the drawings.

In the drawings:

FIG. 4 shows a sleeve body of a rest element according to FIG. 1;

FIG. 5 shows a perspective view of the sleeve body from FIG. 4;

FIG. 6 shows an enlarged detail of the sleeve body from FIG. 4;

Figure 1:
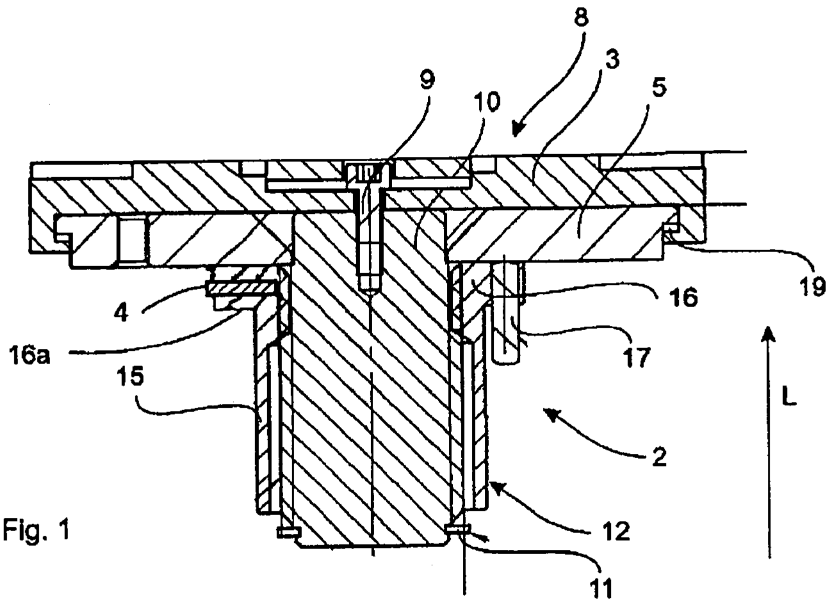
FIG. 1 shows a rest element according to the invention in a first embodiment.

FIG. 1 shows a rest element 2 in a first embodiment. This rest element 2 has a holding plate 8 for holding a region of a vehicle. This holding plate 8 has a contact surface 3 which is connected to parts of the vehicle during lifting of the latter. This contact surface is in this case designed as a rubber support 3. Provided below the rubber support 3 is a round plate 5 which is connected to a threaded piece 10. The rubber support 3 is fixed to the threaded piece 10 by means of a cylindrical screw 9. The holding plate 8 is thus composed of the threaded piece 10, the rubber support 3 and the round plate 5.

It is possible to weld the round plate 5 to the threaded piece 10 and to grind it flat on the top side after the welding process. In the assembled state, the holding plate 8 rests in a sleeve body 12. More specifically, for this purpose, the sleeve body 12 has an inner thread which can be screwed to a corresponding outer thread on the bearing plate 8 or threaded piece 10. The sleeve body 12 has a sleeve section 15 and a collar 16. The round plate 5 of the bearing plate 8 is supported against this collar 16. The rubber support 3 is also fixed to the circumferential edge of the round plate 5 by an overhang 19. The holding plate will also be referred to as the bearing plate below.

Reference 17 denotes a pin of the sleeve body 12, by means of which the latter can be arranged in a preferred position on a support arm. For this, the pin latches into a corresponding opening in the support arm. In this way, the rest element can on the one hand be arranged in the holding arm in a manner secured against rotation but on the other hand can still be easily removed from the support arm, in particular by pulling it out thereof. Conversely, a pin could also be provided in the support arm for engaging in a corresponding opening in the rest element 2.

Reference 11 denotes a securing ring which prevents complete removal of the holding plate 8 from the sleeve body 12.

By rotating the holding plate 8 with respect to the sleeve body 12, it is possible to displace the holding plate with respect to the sleeve body 12 in the longitudinal direction L in FIG. 1. The sensor device 4 according to the invention for force measurement is provided on or in the circumferential collar or circumferential edge 16. More specifically, in the embodiment shown in FIG. 1, four sensor devices are distributed uniformly in the circumferential direction of the holding plate 8 or circumferential collar 16. Care must be taken here to ensure that the full weight force acts between the underside 16*a* and the circumferential edge 16 and the support arm of the lifting platform. By arranging the sensor device 4 at the location shown in FIG. 1, the transmitted weight force can thus be measured directly, namely regardless of whether the holding plate 8 is completely screwed into the sleeve body 12. In the event of a defect or failure of individual sensor devices, it is therefore not necessary to replace the entire support arm but rather it is sufficient to exchange the sleeve body 12 for another sleeve body.

Figure 2:
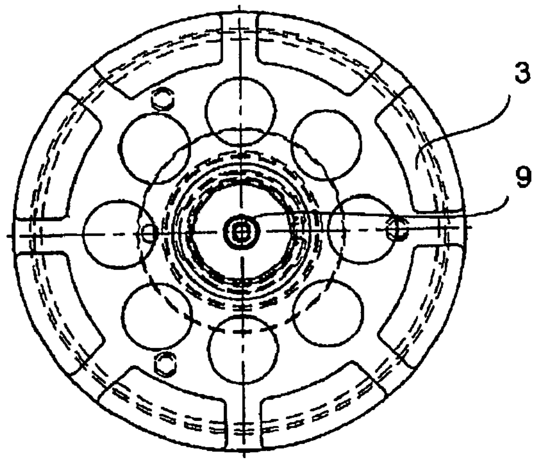
FIG. 2 shows a plan view of the rest element from FIG. 1.

FIG. 2 shows a plan view of the rest element shown in FIG. 1. Both the cylindrical screw 9 which serves to fix the rubber support and the rubber support 3 itself can be seen here.

Figure 3:
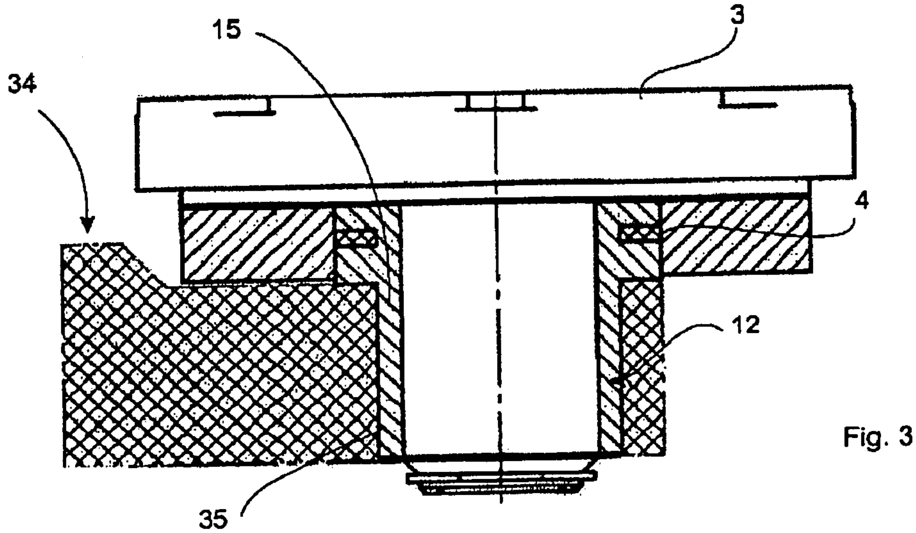
FIG. 3 shows a rest element which is inserted in a support arm.

FIG. 3 shows a further embodiment of a rest element according to the invention which is installed in a support arm of a lifting platform. For this purpose, the support arm has an end section 34 with an opening 35, in which the sleeve body 12 is inserted. Here, too, the sensor device is arranged at the circumferential edge 16 of the sleeve body 12.

FIG. 4 shows a sleeve body 12 and more specifically the circumferential collar 16 thereof. The threaded piece 10 of the holding plate 8 can be arranged within the sleeve section 15. The circumferential collar runs all the way round here, but could also have interruptions.

FIG. 5 shows a perspective view of the sleeve body shown in FIG. 4. Besides a round design of the sleeve section 15, it is also possible to select other shapes, for example elliptical cross sections, polygonal cross sections and the like.

FIG. 6 shows a detail of the circumferential edge 16. This has individual bores or recesses 6 in which the sensor devices 4 are arranged. It is possible for example to mould the sensor device 4 into this recess 6 and in this way fix it therein. It would also be possible to select the opening to be so thin that essentially only the sensor element finds space. Other devices of the sensor device (shown only schematically) can also be provided in the opening, such as an output device 13 which outputs measurement signals. In addition, a transmitting device 14 may also be provided which forwards the measurement signal to a receiving device. Finally, a power storage device 7 is preferably also provided, which supplies the sensor device 4 and the transmitting device 14 with electrical power. This power storage device is preferably a battery.

However, the power storage device 7 and the devices 13 and 14 may also be arranged further inside the sleeve body 12 or else in a region of the sleeve body 12 which is not exposed to any high weight forces. It is also possible to insert a sensor module in the sleeve body, which sensor module consists of the sensor device 4, the transmitting device 14, the power storage device 7 and also optionally further components. In a further preferred embodiment, the power storage device is arranged in such a way that it can be replaced individually. However, it would also be possible to design the entire sensor module in a replaceable manner.

Besides the power storage device 7, it would also be possible to achieve the necessary power supply for example via solar cells on the circumferential edge of the circumferential collar 16.

Figure 7:
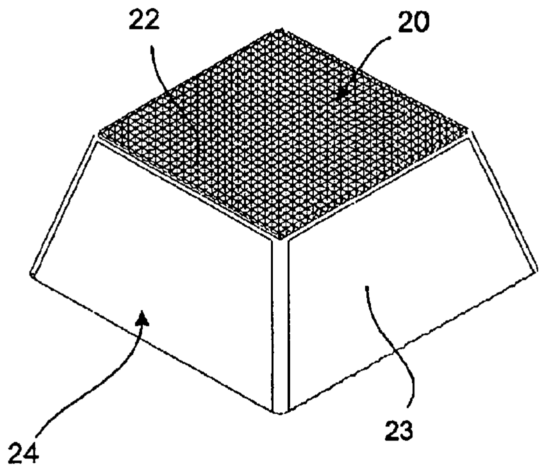
FIG. 7 shows a rest element in a further embodiment.

FIG. 7 shows a further embodiment of a rest element 20. This rest element 20 has a main body 24 which is made of a deformable material such as hard rubber for example. This rest element has an upper bearing surface 22 which is placed against a region of the vehicle during lifting of the vehicle.

This embodiment is particularly suitable for in-floor lifting platforms. Besides the truncated cone shape shown in FIG. 7, the rest element may also have other shapes such as cylindrical shapes, cuboid shapes, semispherical shapes, in particular with flattened areas, shapes with an elliptical diameter, trapezoidal shapes, combinations of these and the like.

In the embodiment shown in FIG. 7, the rest element 20 is in the shape of a truncated cone and, as shown in FIG. 7, is placed for example on lifting components of a lifting platform.

Figure 8:
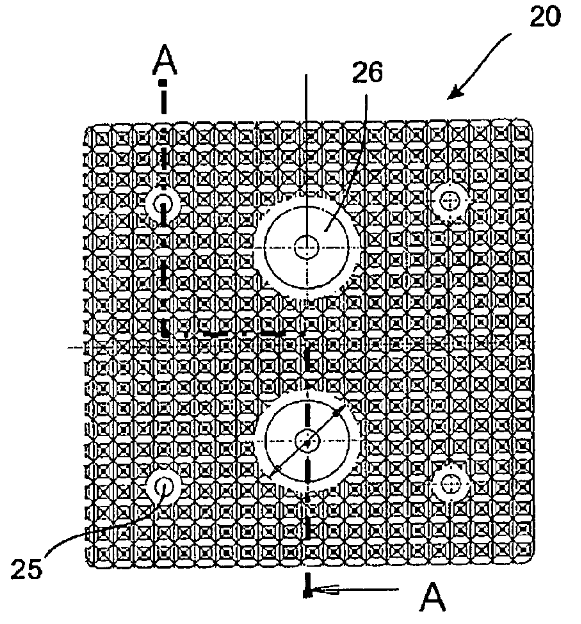
FIG. 8 shows a view from below of the rest element shown in FIG. 7.

FIG. 8 shows the underside of the rest element shown in FIG. 7. Two larger openings 26 and four smaller openings 25 are arranged in this underside. These smaller openings may be used for example to fix the rest element in position with respect to the support arm of a lifting platform.

Figure 9:
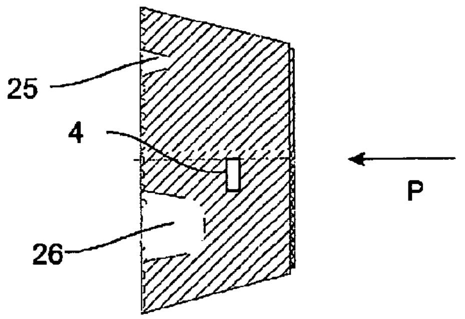
FIG. 9 shows a view of the rest element from FIG. 8 along the line A-A.

FIG. 9 shows an inside view of the rest element from FIG. 7 along the line A-A in FIG. 8. It is also possible to integrated electronic components, such as the abovementioned transmitting device, the power storage device and processor devices, in the larger opening 26. These elements may be moulded into the rest element 20. Here, too, reference 4 denotes a sensor device which serves for measuring the weight force acting along the arrow P. Here, too, it is also possible to provide a plurality of such sensor devices, such as strain gauges. The sensor device in this case may be designed as a flat element which is arranged perpendicular to the plane of the figure.

The advantage of this rest element 20 lies in the fact that it can in principle be arranged at any point on the motor vehicle. This rest element can also be easily replaced with another rest element.

In addition, the rest element 20 may have on one of its side surfaces 23 (FIG. 7) inscriptions which indicate to a mechanic the point at which this rest element must be placed on the vehicle, for example "FR" for front right. In this embodiment, too, the rest element outputs in addition to a measurement signal also an identification signal which makes it possible for a receiving device to assign it to the relevant rest element. If the rest elements are arranged correctly, it is thus also possible to determine the position at which the rest element is arranged with respect to the vehicle.

Figure 10:
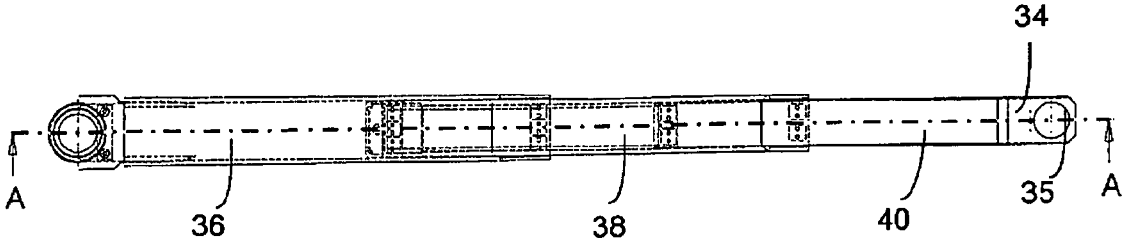
FIG. 10 shows a support arm of a lifting platform.
Figure 11:
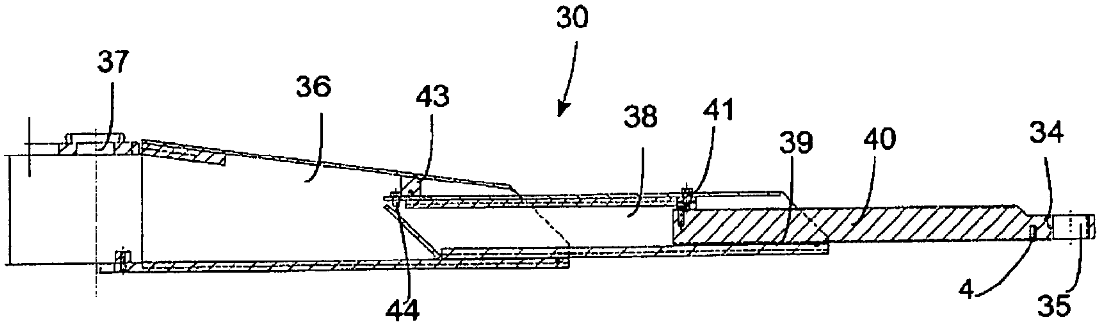
FIG. 11 shows a side view of the support arm from FIG. 10.

FIG. 10 shows a support element 30 of a lifting platform, which in this case has a first support arm section 36 and a second support arm section 40 which can be displaced with respect to this first support arm section. More specifically, this is a support arm 36 on which a central pull-out arm 38 and a front pull-out arm 40 are arranged. This front pull-out arm 40 has an end section 34 with an opening 35. The rest element shown in FIGS. 1 to 3 can be inserted into this opening 35.

However, it is also possible to insert a conventional rest element in the opening or to configure the end section 34 itself as a bearing surface. In this case, the sensor device 4, as shown in FIG. 10, is arranged directly in the end section 34 in order thus to permit direct measurement of the weight force. Preferably, in this case too, a strain gauge is used as the sensor device. In this case too, the strain gauge can be arranged in the end section in such a way that it can easily be replaced.

Reference 43 denotes a sliding element for the central pull-out arm. However, instead of a rest element 2 according to the invention, it is also possible to insert a conventional rest element in the opening 35. In this case, a sensor device 4 would then have to be arranged in the front pull-out arm 40. Particularly preferably, the sensor element is then arranged in the end section 34, since here too, like in the circumferential edge 16, a largely direct measurement of the occurring weight forces is possible. In this embodiment, it would also be possible to integrate transmitting devices and output devices directly in the front pull-out arm 40. One or more sensor elements may also be arranged in the sliding element 43 instead of or in addition to the sensor element in the end section 34.

Reference 37 denotes an articulation, by means of which the support arm 30 can be arranged on the vertical lifting elements of the lifting platform and is thus held in a pivotable manner.

Reference 44 denotes a cylindrical screw for preventing the central pull-out arm 38 from being pulled completely out of the support arm 36. A corresponding cylindrical screw 41 is also arranged on the front support arm 40.

Figure 12:
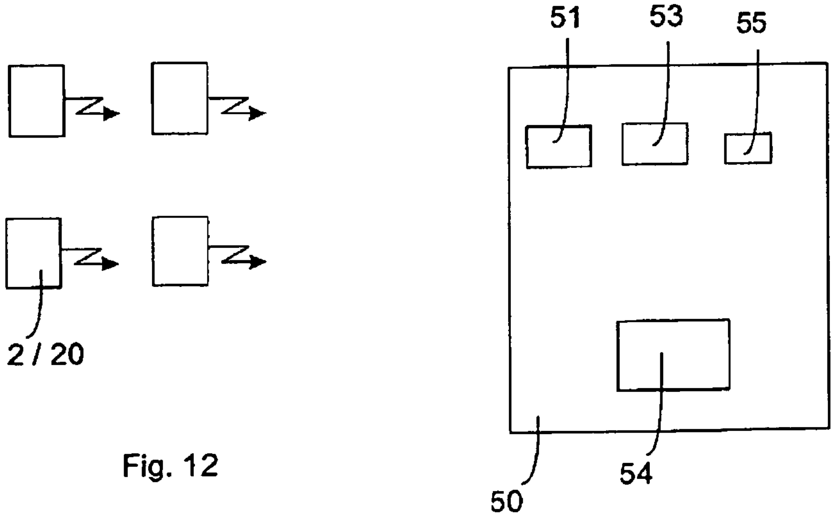
FIG. 12 shows a block diagram of a measuring arrangement according to the invention.

FIG. 12 shows a block diagram of a measuring arrangement according to the invention for lifting platforms. This measuring arrangement has four rest elements of the type shown in FIGS. 1 to 3 or 7 to 9. When loaded, each of these rest elements outputs a signal which is characteristic of a measured weight force. These signals are output to a working unit 50. This working unit 50 has a receiving device 51 for receiving the signals output by the rest elements 2 or 20. In addition, a processor device 53 is provided which receives and analyses signals. In this case, not only can the processor device determine the measured weight forces, but rather it can also determine, on the basis of identification signals, which signal originates from which rest element.

In addition, vehicle data may also be stored in the processor device or in a memory device 55 assigned thereto, which vehicle data are used to assign the individual rest elements to certain points on the vehicle. For example, based on the transmitted values for the weight force, it is possible to determine whether the rest element in question is arranged below a front region of the vehicle or below a rear region of the vehicle since, as mentioned above, these respective weight components differ as a function of the vehicles. Furthermore, the processor device can also determine the position of the rest elements and take this into account when controlling the lifting platform.

Finally, an alarm device may also be provided in the working unit 50, which alarm device triggers an alarm and for example adjusts a lifting process for example when too low a weight force acting on one of the rest elements is ascertained or a non-uniform weight distribution on one or more rest elements is ascertained.

In addition, the working unit 50 has a display device 54 which outputs to the user the respectively measured weight forces, preferably along with an assignment to the respective rest element or region of the vehicle. By means of such a display, it is possible to determine whether the bearing points of the lifting platform are correctly applied to the vehicle. As mentioned above, the working unit is thus associated with the control system of the lifting platform, in order to be able to act on the latter in the event of incorrect weight distributions. The working unit may also have an alarm output device (not shown) which indicates an incorrect weight distribution.

The processor device 53 is thus also able to distinguish signals originating from the rest elements 2, 20 from signals originating from other rest elements or other transmitting devices. If individual rest elements can be replaced, it is possible to store in the working unit the corresponding new addresses of the new rest elements. This new storage can also take place automatically, for example by providing a reading mode which reads in new rest elements or the identification codes thereof. The working device can also preferably be connected to a computer.

The working unit 50 thus also serves to evaluate the signals from the individual sensor devices, in order in this way to determine the loads at the individual bearing areas between the rest elements and the vehicle. By measuring the weight forces acting on the individual rest elements, it is possible by means of the evaluation to ascertain whether the load of the vehicle is correctly distributed, in order to allow safe lifting of the vehicle.

All the features disclosed in the application documents are claimed as essential to the invention in so far as they are novel individually or in combination with respect to the prior art.

LIST OF REFERENCES

2 rest element
3 contact surface, rubber support
4 sensor devices
5 round plate
6 recess
7 power storage device
8 holding plate
9 cylindrical screw
10 threaded piece
11 securing ring
12 sleeve body
13 output device
14 transmitting device
15 sleeve section
16 circumferential collar
**16*a*** underside
19 overhang
20 rest element
22 bearing surface
23 side surfaces
24 main body
25, 26 openings
30 support element
34 end section
35 opening
36 support arm
37 articulation
38 central pull-out arm
40 front pull-out arm
41 cylindrical screw
43 sliding element
44 cylindrical screw
50 working unit
51 receiving device
53 processor device
54 display device
55 memory device
L longitudinal direction
P arrow

The invention claimed is:

1. A rest element for a lifting platform, which can be arranged between a support element of the lifting platform and a vehicle to be lifted, said rest element being removable from the support element and having a sensor device for measuring a weight force acting between the vehicle and the support element, wherein the sensor device outputs a signal which is characteristic of said weight force, and a transmitting device which outputs said characteristic signal or a signal derived from said characteristic signal, wherein the rest element comprises a holding plate for holding a region of the vehicle and a sleeve body, and wherein the sensor device is provided in the sleeve body.

2. The rest element according to claim 1, wherein the transmitting device outputs said characteristic signal wirelessly to a receiving device.

3. The rest element according to claim 1, wherein the sleeve body has a sleeve section which holds a region of the holding plate, and also a circumferential collar which can be supported against the support element of the lifting platform, wherein the sensor device is arranged in said circumferential collar.

4. The rest element according to claim 3, wherein the rest element has a plurality of sensor devices which are distributed uniformly in a circumferential direction of the circumferential collar.

5. The rest element according to claim 1, wherein the holding plate is movable with respect to the sleeve body in a longitudinal direction (L) of the sleeve section.

6. A rest element for lifting platforms, which can be arranged between a support element of the lifting platform and a vehicle to be lifted, said rest element being removable from the support element and having a sensor device for measuring a weight force acting between the vehicle and the support element, wherein the sensor device outputs a signal which is characteristic of said weight force, and a transmitting device which outputs said characteristic signal or a signal derived from said characteristic signal, wherein the rest element has an upper bearing surface which is placed against a region of the vehicle during lifting, said rest element having a main body made of a material which is deformable at least in one direction, and the sensor device is enclosed within the interior of said main body.

7. A measuring arrangement for lifting platforms, comprising a plurality of rest elements as claimed in claim 1 and a central working unit, wherein the working unit has a receiving device for the signals output by the transmitting devices of the rest elements.

8. The measuring arrangement according to claim 7, wherein the working unit has a processor device which assigns the signals output by the rest elements to bearing points on the vehicle to be lifted.

9. A lifting platform comprising at least one rest element as claimed in claim 1.

10. A measuring arrangement for lifting platforms, comprising a plurality of rest elements and a central working unit, wherein the rest element is arranged between a support element of the lifting platform and a vehicle to be lifted, said rest element being removable from the support element and having a sensor device for measuring a weight force acting between the vehicle and the support element, wherein the sensor device outputs a signal which is characteristic of said weight force, and a transmitting device which outputs said characteristic signal or a signal derived from said characteristic signal, wherein the rest element has a main body made of a material which is deformable at least in one direction, and the sensor device is arranged in the interior of said main body, and wherein the working unit has a receiving device for the signals output by the transmitting devices of the rest elements.

11. The measuring arrangement according to claim 10, wherein the working unit has a processor device which assigns the signals output by the rest elements to bearing points on the vehicle to be lifted.

12. A lifting platform comprising at least one rest element as claimed in claim 6.

* * * * *